(12) United States Patent
Zhang et al.

(10) Patent No.: US 7,912,198 B2
(45) Date of Patent: Mar. 22, 2011

(54) SYSTEM AND METHOD FOR IMPLEMENTING MULTIMEDIA RING BACK TONE SERVICE

(75) Inventors: Hui Zhang, Shenzhen (CN); Weirong Jin, Shenzhen (CN); Yihua Cheng, Shenzhen (CN)

(73) Assignee: Huawei Technologies Co., Ltd., Shenzen (CN)

( * ) Notice: Subject to any disclaimer, the term of this patent is extended or adjusted under 35 U.S.C. 154(b) by 1053 days.

(21) Appl. No.: 11/626,803

(22) Filed: Jan. 24, 2007

(65) Prior Publication Data

US 2007/0268359 A1  Nov. 22, 2007

Related U.S. Application Data

(63) Continuation of application No. PCT/CN2006/000994, filed on May 16, 2006.

(30) Foreign Application Priority Data

May 16, 2005  (CN) .......................... 2005 1 0069588
May 16, 2005  (CN) .......................... 2005 1 0069589

(51) Int. Cl.
*H04M 3/42* (2006.01)
*H04M 1/64* (2006.01)
(52) U.S. Cl. .... 379/207.16; 379/85; 379/87; 455/412.2; 348/14.01; 348/14.02
(58) Field of Classification Search ............. 379/85, 379/87, 207.16; 455/412.2; 348/14.01, 14.02
See application file for complete search history.

(56) References Cited

U.S. PATENT DOCUMENTS

| | | | |
|---|---|---|---|
| 2004/0120494 A1 | 6/2004 | Jiang et al. | |
| 2007/0268359 A1* | 11/2007 | Zhang et al. | 348/14.01 |
| 2008/0102800 A1* | 5/2008 | Cheng et al. | 455/412.2 |
| 2009/0279675 A1* | 11/2009 | Xu et al. | 379/85 |
| 2009/0303310 A1* | 12/2009 | Zhang et al. | 348/14.02 |
| 2010/0002849 A1* | 1/2010 | Wang et al. | 379/87 |

(Continued)

FOREIGN PATENT DOCUMENTS

CN    1545346 A    11/2004

(Continued)

OTHER PUBLICATIONS

Extended European Search Report in corresponding European Patent Application No. 06741882.2 (Aug. 29, 2008).

(Continued)

*Primary Examiner* — William D Cumming
(74) *Attorney, Agent, or Firm* — Leydig, Voit & Mayer, Ltd.

(57) ABSTRACT

A system for implementing multimedia ring back tone service is disclosed, which includes a communication network, an MRBT platform storing multimedia ring back tones in the communication network and a VIG. The MRBT platform is respectively connected to the Service Switch Center dominating the terminal and an MGW in the communication network through the VIG; when a calling terminal initiates a call through the Service Switch Center, the VIG establishes a communication link from the terminal to the MRBT platform through the MGW and the VIG before the call is put through; and MRBT platform plays multimedia ring back tones for the calling terminal via the established communication link. The present invention also provides a method for implementing multimedia ring back tone service is also disclosed. The system and the method can implement multimedia ring back tone service in 3G communication networks.

17 Claims, 5 Drawing Sheets

U.S. PATENT DOCUMENTS

| | | | |
|---|---|---|---|
| 2010/0066801 A1* | 3/2010 | Zhu et al. | 348/14.01 |
| 2010/0166156 A1* | 7/2010 | Xu et al. | 379/87 |

FOREIGN PATENT DOCUMENTS

| | | |
|---|---|---|
| CN | 1556645 A | 12/2004 |
| JP | 2005-033442 A | 2/2005 |
| KR | 2004-0105517 A | 12/2004 |
| WO | WO 01/06735 A2 | 1/2001 |
| WO | WO 01/06735 A3 | 1/2001 |
| WO | WO 2004/054282 A1 | 6/2004 |
| WO | WO 2004/084566 A1 | 9/2004 |
| WO | WO 2005/043926 A2 | 5/2005 |

OTHER PUBLICATIONS

State Intellectual Property Office of the People's Republic of China, English Translation of Written Opinion of the International Searching Authority in International Patent Application No. PCT/CN2006/000994 (Sep. 7, 2006).

1st Office Action from the Chinese Patent Office in corresponding Chinese Patent Application No. 200510069588.7 (Aug. 1, 2008).

$2^{nd}$ Office Action from the Chinese Patent Office in corresponding Chinese Patent Application No. 200510069588.7 (Jun. 19, 2009).

* cited by examiner

US 7,912,198 B2

SYSTEM AND METHOD FOR IMPLEMENTING MULTIMEDIA RING BACK TONE SERVICE

This application is a continuation of International Patent Application No. PCT/CN2006/000994, filed May 16, 2006, which claims priority to Chinese Patent Application No. 200510069589.1, filed May 16, 2005 and Chinese Patent Application No. 200510069588.7, filed May 16, 2005, all of which are hereby incorporated by reference.

FIELD OF THE TECHNOLOGY

The present invention relates to ring back tone techniques in communication networks in general. More specifically, the present invention relates to a system for implementing multimedia ring back tone service and a method thereof.

BACKGROUND OF THE INVENTION

In general, so-called ring tone refers to the ringing tone of a called terminal when receiving a call; while the ring back tone refers to the ringing tone played by network for a calling terminal when the calling terminal calls the called terminal. While waiting for the receiving party to pick up, what the caller hears is the ring back tone subscribed by the called terminal in the network of the communication system but not the original ringing tone. The ring back tones could be music or songs stored in advance on the network of the communication system which provides the ring back tone service.

The ring back tone service may be applied to not only mobile networks, but also fixed networks or 3G communication networks, such as WCDMA network.

Since 3G communication networks support multimedia service, not only voice but also video pictures may be adopted as ring back tones in 3G communication networks. However, multimedia ring back tone service is not yet realized in 3G communication networks.

SUMMARY OF THE INVENTION

One embodiment of the present invention is a system for implementing Multimedia Ring Back Tone (MRBT) service, the system includes:

a communication network;

a Video Interactive Gateway (VIG), for establishing a communication link from a calling terminal to an MRBT platform through a Multimedia Gateway (MGW) and the VIG during the interval of a call being initiated through a Service Switch Center by the calling terminal and the call being put through;

the MRBT platform, connected to the Service Switch Center dominating the calling terminal and the MGW in the communication network via the VIG respectively, for storing multimedia ring back tones and playing a multimedia ring back tone for the calling terminal via the established communication link.

Another embodiment of the present invention is a method for implementing Multimedia Ring Back Tone service includes:

configuring an MRBT platform for storing multimedia ring back tones and a VIG for interacting with the MRBT platform and a calling terminal in the communication network;

establishing a communication link from the MRBT platform to the calling terminal via the VIG during the interval of the calling terminal initiating a call to a called terminal and the call being put through;

playing the multimedia ring back tone subscribed by the called terminal for the calling terminal through the communication link by the MRBT platform.

Another embodiment of the present invention is a system for implementing MRBT service includes:

a Wideband Code Division Multiple Access (WCDMA) network;

a VIG, for establishing a communication link from a calling terminal to an MRBT platform through an MGW and the VIG during the interval of a call being initiated through a Service Switch Center by the calling terminal and the call being put through;

the MRBT platform, connected to the Service Switch Center dominating the calling terminal and the MGW in the WCDMA network via the VIG respectively, for storing multimedia ring back tones and playing a multimedia ring back tone for the calling terminal via the established communication link.

Another embodiment of the present invention is a Service Switch Center which is connected to an MGW in a communication network, Service Switch Center includes:

a VIG, for establishing a communication link from a calling terminal to an MRBT platform through the MGW and the VIG during the interval of the calling terminal initiating a call and the call being put through, wherein the communication link is used for the MRBT platform to play a multimedia ring back tone for the calling terminal.

Another embodiment of the present invention is an MRBT platform which is connected to a Service Switch Center dominating a calling terminal and an MGW in a communication network via a VIG respectively includes:

a unit for storing multimedia ring back tones; and a unit for playing a multimedia ring back tone for the calling terminal via an established communication link between the MRBT platform and the calling terminal via the VIG and the MGW.

Another embodiment of the present invention is a method for implementing MRBT service includes:

establishing a communication link from an MRBT platform to a calling terminal via a VIG during the interval of the calling terminal initiating a call to a called terminal and the call being put through;

playing a stored multimedia ring back tone subscribed by the called terminal for the calling terminal through a communication link by the MRBT platform.

As can be seen from above-mentioned scheme, a MRBT platform which provides multimedia ring back tones and a VIG used for transmitting multimedia ring back tones between the terminal and the MRBT platform are added in a WCDMA network. When a ring back tone needs to be played to the calling terminal, the VIG will establish a communication link from the MRBT platform to the calling terminal passing through the VIG and the MGW, and the MRBT platform will transmit a stored multimedia ring back tone to the calling terminal. Further the VIG may be integrated in the MSC Server of 3G communication network, when a ring back tone is played for the calling terminal, the MSC Server with VIG function will establish a communication link from the MRBT platform to the calling terminal passing through the MSC Server with VIG function and the MGW, and the MRBT platform will transmit the stored multimedia ring back tone to the calling terminal. The multimedia ring back tone service may be realized in 3G communication networks.

DETAILED DESCRIPTION OF THE INVENTION

The present invention will be described in detail hereinafter with reference to embodiments and accompanying drawings.

The present invention embodiments will be described by taking a WCDMA network as an example of 3G communication network.

Figure 1:
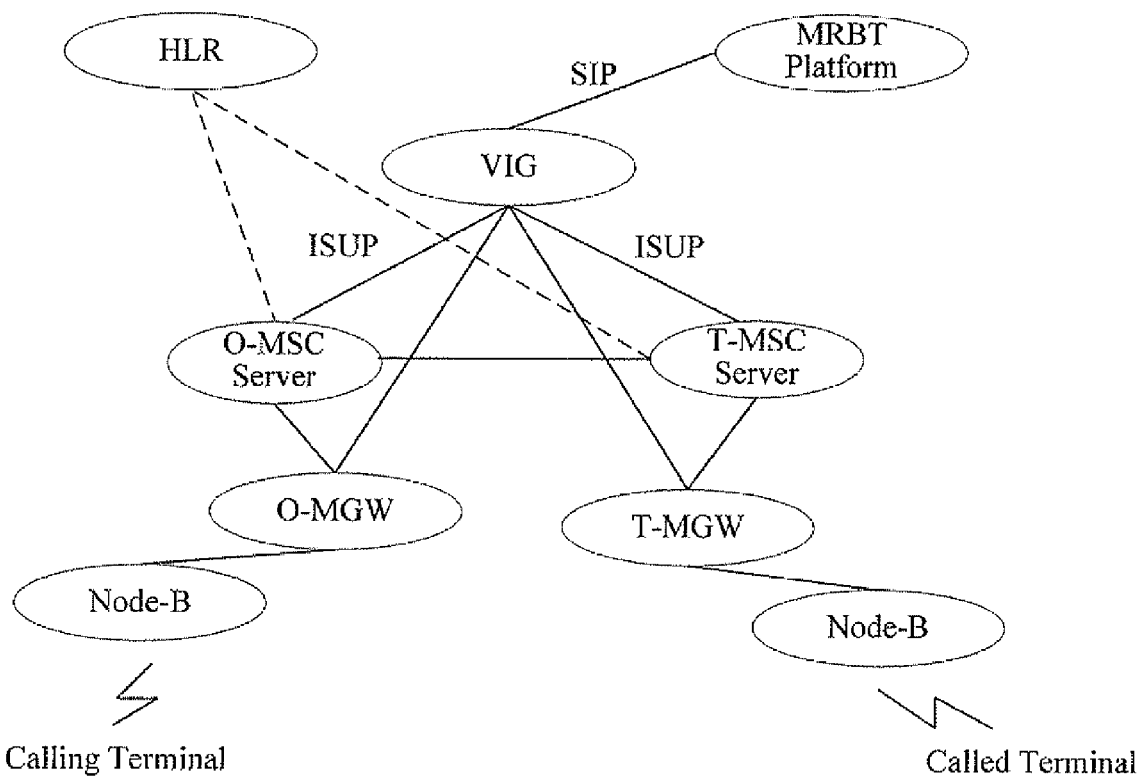
FIG. 1 is a schematic diagram illustrating a system for implementing multimedia ring back tone service in a WCDMA system according to an embodiment of the present invention.

According to embodiments of the present invention, in order to implement multimedia ring back tone service in a WCDMA network, a Video Interactive Gateway (VIG) and a Multimedia Ring Back Tone (MRBT) platform is added in the WCDMA system. Here, the VIG is used for supporting the MRBT platform to play ring back tone for the terminal. FIG. 1 shows a schematic diagram illustrating a system for implementing multimedia ring back tone service in WCDMA network in accordance with an embodiment of the present invention. As shown in FIG. 1, the system for implementing multimedia ring back tone includes a calling terminal, NodeB to which the calling terminal belongs, Mobile switching center Server dominating the NodeB of the calling terminal (O-MSC Server) and Media GateWay of the calling terminal (O-MGW), a called terminal, NodeB of the called terminal, MSC Server dominating the NodeB of the called terminal (T-MSC Server) and MGW of the called terminal (T-MGW), a VIG, a Home Location Register (HLR) and a MRBT platform.

Here, the main functions of the MSC Server are mobile service switch and call control, wherein the O-MSC Server is the MSC Server of the calling terminal, and the T-MSC Server is the visited MSC Server of the called terminal which stores current information of the calling terminal and routes the call to the called terminal during the call process.

The MGW is mainly used for connecting the VIG with the terminal, by which the multimedia ring back tones may be transmitted from the VIG to the terminal.

The HLR stores subscription information of the terminal and supplies the MSC Server the subscription information of the terminal currently dominated by the MSC server through interaction with the MSC Server. The information indicating whether the terminal has subscribed to the multimedia ring back tone service is stored in the HLR, and when the HLR returns a response to the MSC Server, it will carry supplementary service code (SS-CODE) in the response to identify whether the terminal has subscribed to the ring back tone service.

The VIG may be configured between the MRBT platform and the MSC Server, as well as between the MRBT platform and the MGW, and the MRBT platform plays multimedia ring back tones for the terminal through the VIG.

The MRBT platform stores a multimedia ring back tone subscribed by the terminal in advance, and when the terminal is called, the MRBT will transmit the multimedia ring back tone to the terminal through the VIG and the MGW in turn.

In an embodiment of the present invention, signalling exchange between the VIG and the MGW is generated by the trunk circuit or IP network. The signalling exchange between the VIG and the MSC Server may use ISDN User Part (ISUP) signal; while the signalling exchange between the VIG and the MRBT platform applies Session Initiation protocol (SIP) and is beared by IP network.

Figure 2:
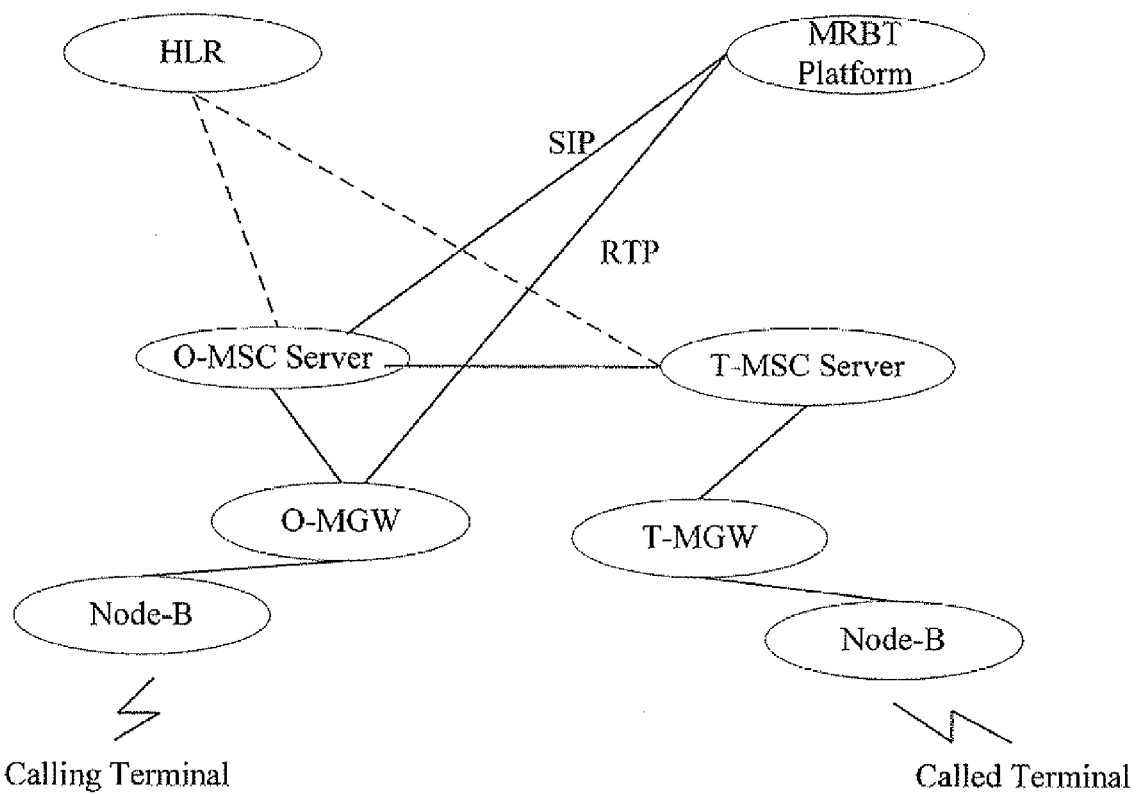
FIG. 2 is a schematic diagram illustrating a system for implementing multimedia ring back tone service in a WCDMA system according to another embodiment of the present invention.

The VIG may also be integrated in the MSC Server. As shown in FIG. 2, the O-MSC Server has the function of VIG and may support the MRBT platform to play multimedia ring back tones for the terminal. In this case, the signalling exchange between the MRBT platform and the MSC Server with VIG function is beared by IP, and the information which is to be transmitted or the information which has received adopts SIP. The signalling exchange between the MRBT platform and the MGW adopts Real-time Transport Protocol (RTP), and signalling exchange between the O-MSC Server and the MRBT platform adopts SIP.

Figure 3:
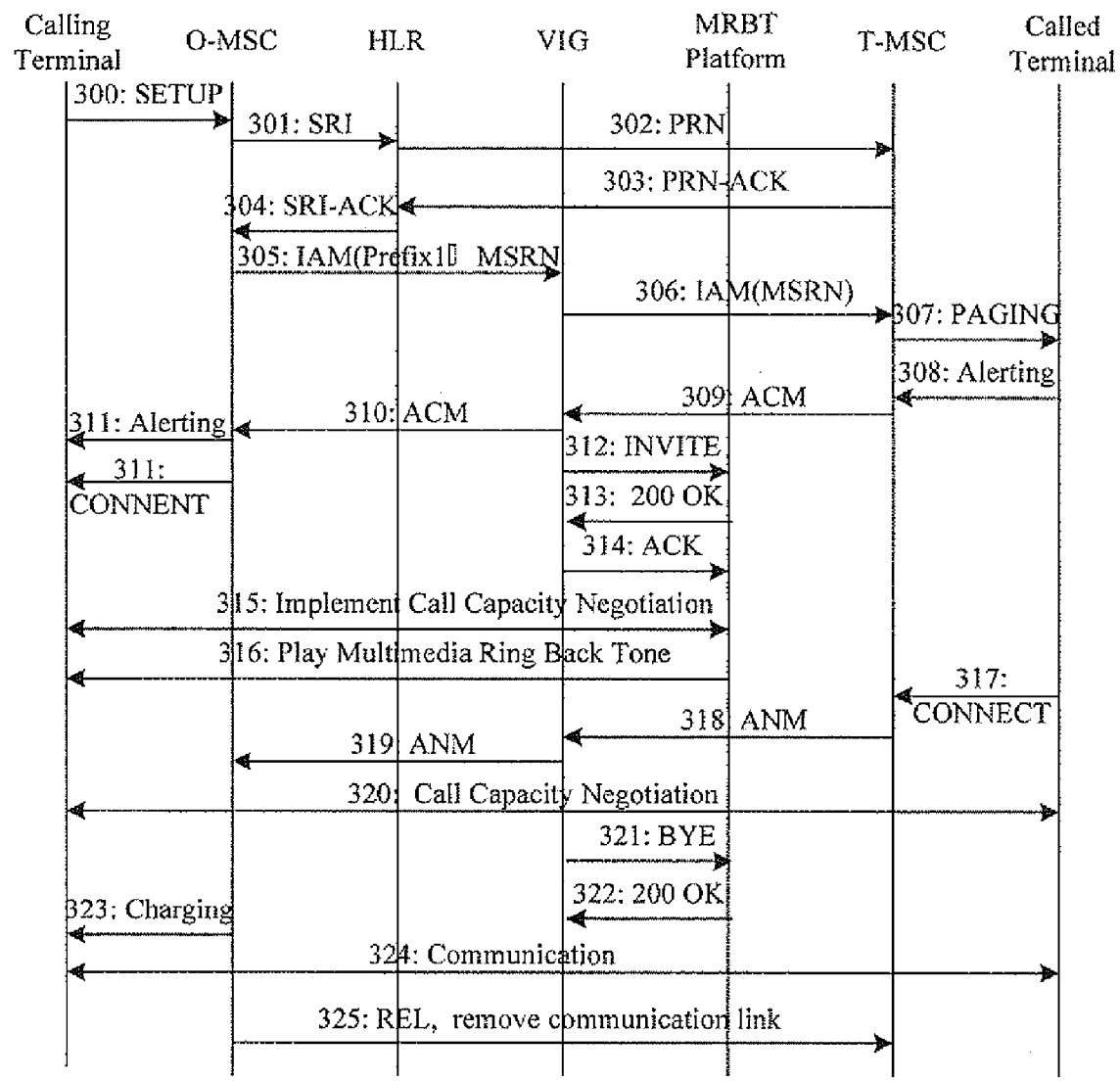
FIG. 3 is a simplified flowchart of implementing multimedia ring back tone service in a WCDMA system according to an embodiment of the present invention.

FIG. 3 shows a simplified flow chart of implementing multimedia ring back tone service in a WCDMA system according to an embodiment of the present invention, and the procedure of FIG. 3 is based on the system of FIG. 1. In this embodiment, both the calling terminal and the called terminal are 3G communication network terminals. The calling terminal initiates a Video Phone (VP) call to the called terminal, and signalling exchange between the O-MSC Server and the T-MSC Server adopts ISUP protocol. The main processes of this embodiment include:

Step 300: The calling terminal dials the number of the called terminal, i.e., sends a SETUP message to the O-MSC Server to initiate a VP call. The number of the called terminal is a Mobile Subscriber Integrated Services Digital Network (ISDN) Number (MSISDN).

Step 301: The O-MSC Server, according to the MSISDN carried by the current call, sends to the HLR a Send Routing Information (SRI) message to request the location of the called terminal.

Step 302: The HLR sends to the current T-MSC Server of the called terminal a Provide Roaming Number (PRN) message to request the current roaming number of the called terminal.

Step 303: The T-MSC Server sends to the HLR a PRN acknowledge (PRN_ACK) message carrying the roaming number of the called terminal.

Step 304: The HLR sends to the O-MSC Server an SRI acknowledge (SRI_ACK) message carrying the obtained roaming number of the called terminal, and the SS-CODE in the SRI-ACK message is set as a specific value designated by operators and used to identify whether the called terminal has subscribed to the ring back tone service.

Step 305: The O-MSC Server, according to the SRI-ACK message, determines whether the called terminal has subscribed to the ring back tone service, and then, base on the property of initiating the VP call, the and the call supported by the calling terminal and network of the calling terminal to determines whether the current call is a VP call.

If both the network of the calling terminal and the calling terminal support the VP call, and the call initiated by the calling terminal is the VP call, the current call is determined as the VP call; otherwise, the current call is regarded as a Speech Phone. The processing procedure of Speech Phone is described in the following FIG. 4.

The O-MSC Server sends an Initial Address Message (IAM) message to the VIG, and the number of the called terminal carried by the message is "Prefix 1+MSRN (Mobile Subscriber Roaming Number)". Here, Prefix1 is an indicator of VP call, by which the O-MSC routes the call to the VIG, and MSRN is an indicator of the current network of the called terminal.

Step 306: Upon receiving the IAM message, the VIG routes the current call carrying the MSRN to the T-MSC Server.

Step 307: The T-MSC Server pages the called terminal according to the MSRN carried by the current call.

Step 308: Upon being successfully paged, the called terminal sends an Altering message to the T-MSC Server.

Steps 309~310: Upon receiving the Altering message, the T-MSC Server sends an Address Complete Message (ACM) message to the O-MSC Server via the VIG, instructing the O-MSC Server to put though the calling terminal.

Step 311: The O-MSC Server determines the multimedia ring back tone which may be played for the calling terminal this time, and sends to the calling terminal an Alerting message and a CONNECT message in turn to connect the calling terminal. Here, charging is not yet be implemented.

Step 312: The VIG takes "Prefix 2+Flag+MSISDN of the called terminal" as the number of the called terminal. According to SIP protocol, Prefix2 is an indicator for the VIG to route the call to the multimedia ring back tone platform, and Flag is an indicator of playing multimedia ring back tone. The VIG sends to the MRBT platform an INVITE message which carries the number of the calling terminal.

Step 313: The MRBT platform sends a 200 OK message to the VIG.

Step 314: The VIG returns an Acknowledgement (ACK) message to the MRBT platform.

Step 315: The calling terminal receiving the CONNECT message implements Capacity Negotiation with the MRBT platform through the MGW and the VIG, and a communication link is established from the calling terminal to the MRBT platform, passing through the MGW and the VIG.

To play multimedia ring back tone, e.g., video ring back tone, for the calling terminal by the MRBT platform, a communication link is established from the calling terminal to the MRBT platform, passing through the O-MGW and the VIG in steps 311~315.

Step 316: The MRBT platform, according to the information of ring back tone service set by the called terminal in advance, inquire about the multimedia ring back tone subscribed by the called terminal, and plays the multimedia ring back tone such as a video ring back tone for the calling terminal through the O-MGW and the VIG in turn.

Step 317: The called terminal sends a CONNECT message to the T-MSC Server after answering the current call.

Step 318: The T-MSC Server sends an Answer Message (ANM) to the VIG.

Steps 319~320: The VIG sends an ANM message to the O-MSC Server, and the O-MSC puts through the calling terminal and the called terminal after the Call Capacity Negotiation between the calling terminal and the called terminal is completed.

Step 321: The VIG terminates the communication link between itself and the MRBT platform, and sends a BYE message to the MRBT platform.

Step 322: The MRBT platform sends a 200 OK message to the VIG.

Step 323: The O-MSC Server receiving the ANM message starts to charge the calling terminal.

Step 324: The calling terminal and the called terminal start to communicate with each other after the VIG completes the Call Capacity Negotiation between the calling terminal and the called terminal.

Step 325: When the calling terminal or the called terminal terminates the current call, the calling terminal sends a REL message to the T-MSC Server via the O-MSC Server, or the called terminal sends a REL message to the O-MSC Server via the T-MSC Server, to terminate the connection between the calling terminal and the called terminal and release the call, and then the O-MSC Server stops charging the calling terminal.

As shown in FIG. 3, since a communication link from the MRBT platform to the calling terminal which passes through the VIG and the O-MGW in turn could be established before the MRBT platform plays the multimedia ring back tone for the calling terminal, the Call Capacity Negotiation between the MRBT platform and the calling terminal should be completed. After the communication link between the MRBT platform and the calling terminal is established, the O-MSC Server will receive the ACM message sent by the VIG. Here, the O-MSC Server would not charge the calling terminal until the communication link between the calling terminal and the called terminal is established and the calling terminal and the called terminal are put through upon receiving the ANM message sent by the VIG. So there is no need to charge the calling terminal for the pre-established communication link between the VIG and the calling terminal which is used for playing the multimedia ring back tones, by which the calling terminal will not pay for receiving the multimedia ring back tone, thereby improving the users' enthusiasm of using multimedia ring back tone service and facilitate the popularization of multimedia ring back tone service.

To establish the communication link from the MRBT platform to the calling terminal which passes through the VIG and the O-MGW in turn, the VIG should implement the Call Capacity Negotiation with the calling terminal. Since the VIG does not know the call capacity level of the called terminal, it will select a media format according to the call capacity level supported by the calling terminal, and the MRBT platform will play the media ring back tone for the calling terminal through the established communication link. After the called terminal answers, the VIG will implement the Call Capacity Negotiation with the called terminal, and if the called terminal does not support the media format selected by the VIG for the calling terminal, the current call fails.

The call capacity levels supported by each 3G communication network terminal should be investigated and taken statistics before the multimedia ring back tone service is carried out. Media formats supported by all terminals are selected and configured in the VIG, which will become the basis of Call Capacity Negotiation between the VIG and the calling terminal or the called terminal during the process of playing multimedia ring back tone and the communication between the calling terminal and the called terminal.

Once the called terminal does not support the selected media format supported by the calling terminal during the process of playing multimedia ring back tone, the VIG will transform the media format of the media streams transmitted by the called terminal during the communication process, which will guarantee the normal communication between the calling terminal and the called terminal.

In the embodiment shown in FIG. 3, the VIG and the MRBT platform may agree on several call capacity levels. Upon receiving the INVITE message sent by the VIG, the MRBT platform sends to the VIG the 200 OK message carrying the media format selected by it this time, informing the VIG of the media format used by the communication link established from the MRBT platform to the calling terminal, thereby reducing the signalling interaction processes of Call Capacity Negotiation for establishing communication link and shortening the response time of playing multimedia ring back tones.

Figure 4:
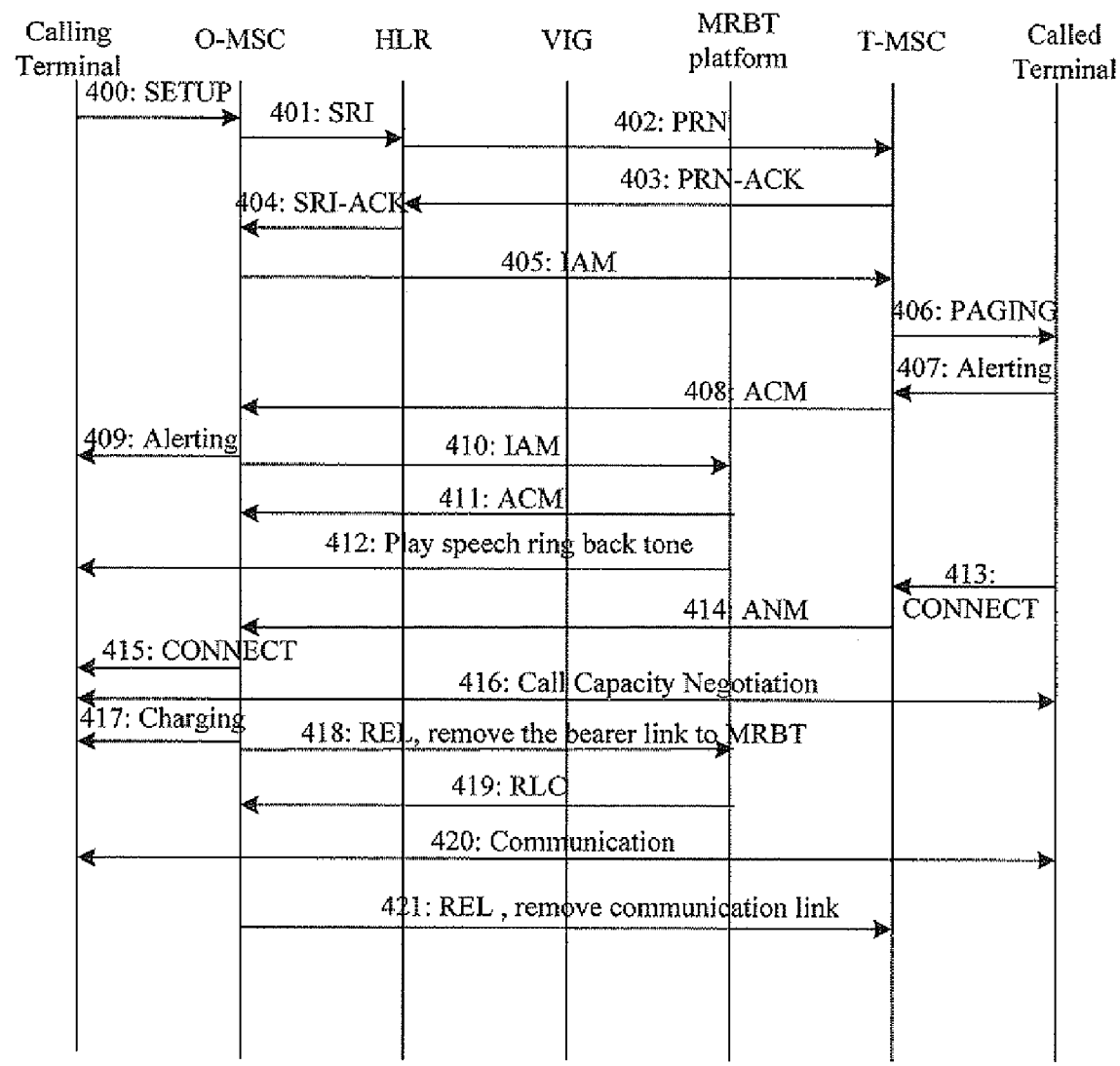
FIG. 4 is a simplified flowchart of implementing multimedia ring back tone service in a WCDMA system according to another embodiment of the present invention.

The MRBT platform may also store speech ring back tones subscribed by the called terminal and played for the calling terminal. FIG. 4 shows a flow chart of implementing multimedia ring back tone service in a WCDMA system according to another embodiment of the present invention, and the procedure of FIG. 4 is based on the system shown in FIG. 1. In this embodiment, the calling terminal is a 3G communication network terminal, the called terminal is a 2G communication network terminal, the calling terminal initiates a Speech Phone to the called terminal, and signalling exchange between the O-MSC Server and the T-MSC Server adopts ISUP protocol. The main process of this embodiment include:

Step 400: The calling terminal dials the number of the called terminal, i.e., sends a SETUP message to the O-MSC Server to initiate a Speech Phone. The number of the called terminal is a MSISDN.

Step 401: The O-MSC Server sends a SRI message to the HLR to request the location of the called terminal.

Step 402: The HLR sends to the T-MSC Server of the called terminal a PRN message to request the current roaming number of the called terminal.

Step 403: The T-MSC Server sends to the HLR a PRN-ACK message carrying the roaming number of the called terminal.

Step 404: The HLR sends to the O-MSC a SRI-ACK message carrying the obtained roaming number of the called terminal, and the SS-CODE in the SRI-ACK message is set as a specific value designated by operators and used to identify whether the called terminal has subscribed to the ring back tone service.

Step 405: The O-MSC Server, according to the SRI-ACK message, determines whether the called terminal has subscribed to the ring back tone service, and then, according to the call supported by the network of the calling terminal, the call supported by the calling terminal and the properties of initiating the current call, determines whether the current call is a Speech Phone call.

If both the network of the calling terminal and the calling terminal support the VP call, and the call initiated by the calling terminal is the VP call, the current call is determined as the VP call and the whole processing of the VP call is shown in FIG. 3; otherwise, the current call is regarded as a Speech Phone call.

The O-MSC Server sends to the T-MSC Server the current call carrying the MSRN, i.e., an IAM message.

Step 406: The T-MSC Server, according to the MSRN carried by the current call, pages the called terminal.

Step 407: Upon being successfully paged, the called terminal sends an Alerting message to the T-MSC Server.

Step 408: The T-MSC Server receiving the Alerting message sends an ACM message to the O-MSC Server.

Steps 409~410: The O-MSC Server receiving the ACM message sends an Alerting message to the calling terminal, and at the same time, sends to the MRBT platform an IAM message which is passed transparently by the VIG to establish a bearer connection from the calling terminal to the MRBT platform through the O-MSC Server.

If the O-MSC Server connects with the MRBT platform directly, the IAM message may be sent to the MRBT platform directly without being passed transparently by the VIG.

Step 411: The MRBT platform receiving the IAM message sends to the O-MSC Server an ACM message which is passed transparently by the VIG.

If the O-MSC Server connects with the MRBT platform directly, the ACM message may be sent to the MRBT platform directly with being passed transparently by the VIG.

Step 412: The MRBT platform, according to the information of ring back tone service set by the called terminal in advance, inquires about the multimedia ring back tone for the calling terminal subscribed by the called terminal, and plays the speech ring back tone for the calling terminal through the O-MSC Server.

Step 413: The called terminal sends a CONNECT message to the T-MSC Server after answering the current call.

Step 414: The T-MSC Server sends an ANM message to the O-MSC Server.

Steps 415~417: The O-MSC Server receiving the ANM message sends a CONNECT message to the calling terminal. After the Call Capacity Negotiation between the calling terminal and the called terminal is implemented, the O-MSC Server establishes a communication link between the calling terminal and the called terminal and starts to charge the calling terminal.

Step 418: The O-MSC Server sends a REL message to the MRBT platform through the VIG to release the bearer connection between the O-MSC Server and the MRBT platform.

If the O-MSC Server connects with the MRBT platform directly, the REL message may be sent to the MRBT platform directly without being passed transparently by the VIG.

Step 419: The MRBT platform receiving the REL message stops playing the speech ring back tone for the calling terminal, releases the bearer connection established between the O-MSC Server and the calling terminal, and sends a RLC message to the O-MSC Server.

Step 420: The calling terminal and the called terminal communicate with each other through the established communication link.

Step 421: When the calling terminal or the called terminal terminates the current call, the calling terminal sends a REL message to the T-MSC Server via the O-MSC Server, or the called terminal sends a REL message to the O-MSC Server via the T-MSC Server, to terminate the connection between the calling terminal and the called terminal and release the call, and then the O-MSC Server stops charging the calling terminal.

Figure 5:
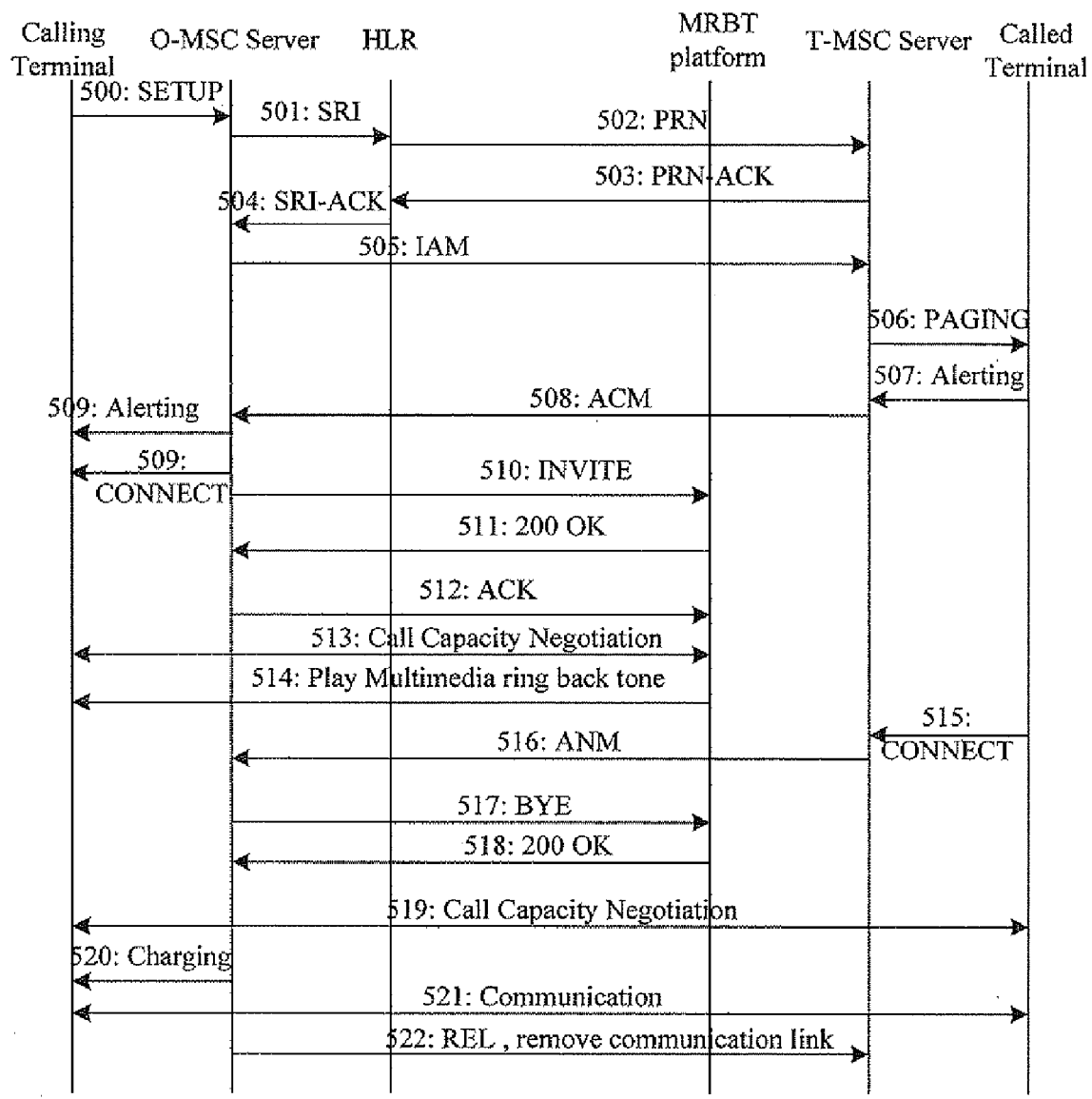
FIG. 5 is a simplified flowchart of implementing multimedia ring back tone service in a WCDMA system according to yet another embodiment of the present invention.

FIG. 5 shows a flow chart of implementing multimedia ring back tone service in WCDMA system according to an embodiment of the present invention. The procedure is based on the system shown in FIG. 2, including the processes of:

Steps 500~504 are the same as steps 300~304 shown in FIG. 3.

Step 505: The O-MSC Server, according to the SRI-ACK message, determines whether the called terminal has subscribed to the ring back tone service, and then, according to the call supported by the network of the calling terminal, the call supported by the calling terminal and the properties of initiating the current call, determines whether the current call is a VP call.

If both the network of the calling terminal and the calling terminal support the VP call, and the call initiated by the calling terminal is the VP call, the current call is determined as the VP call; otherwise, the current call is regarded as a Speech Phone call. The processing procedure of Speech Phone call is described in FIG. 4.

The O-MSC Server sends an IAM message carrying the MSRN of the called terminal to the T-MSC Server used for paging the called terminal.

Step 506: The T-MSC Server, according to the MSRN carried by the message, pages the called terminal.

Step 507 is the same as step 308 shown in FIG. 3. Upon being successfully paged, the called terminal sends an Alerting message to the T-MSC Server.

Step 508: Upon receiving the Alerting message, the T-MSC Server sends an ACM message to the O-MSC Server to request the O-MSC Server to put through the calling terminal.

Step 509 is the same as process 311 shown in FIG. 3. The O-MSC Server determines the multimedia ring back tone which may be played for the calling terminal this time, and sends to the calling terminal an Alerting message and a CONNECT message in turn to connect the calling terminal. Here, charging is not yet be implemented.

Step 510: The O-MSC Server takes "Prefix+Flag+MSISDN of the called terminal" as the number of the called terminal. According to SIP protocol, Prefix is an indicator for routing the call to RBT platform, and Flag is an indicator for indicating whether to play a multimedia ring back tone or a ring back tone. The O-MSC sends to the MRBT platform an INVITE message carrying the number of the calling terminal.

Steps 511~512 are the same as steps 313~314 shown in FIG. 3.

Step 513: The calling terminal receiving the CONNECT message completes Capacity Negotiation and a communication link is established from the calling terminal to the MRBT platform, passing through the O-MGW and the O-MSC Server.

To play multimedia ring back tone, e.g., video ring back tone, for the calling terminal by the MRBT platform, a communication link is established from the calling terminal to the MRBT platform, passing through the O-MGW and the VIG in steps 508~513.

Step 514: The MRBT platform, according to the information of ring back tone service set by the called terminal in advance, acquires about the multimedia ring back tone for the calling terminal subscribed by the called terminal, and plays the multimedia ring back tone such as video ring back tone for the calling terminal through the O-MSC Server and O-MGW in turn.

Since the VIG function is integrated in the O-MSC Server in advance, the O-MSC Server may establish the communication link between the MRBT platform and the calling terminal and the multimedia ring back tone may be transferred through the communication link.

Step 515 is the same as step 317 shown in FIG. 3. The called terminal sends a CONNECT message to the T-MSC Server after answering the current call.

Step 516: The T-MSC Server sends an ANM message to the O-MSC Server

Step 517: The O-MSC Server terminates the communication link between itself and the MRBT platform, and sends a BYE message to the MRBT platform.

Step 518: The MRBT platform sends a 200 OK message to the O-MSC Server.

Steps 519~520: The O-MSC Server completes the Call Capacity Negotiation, establishes the communication link from the calling terminal to the called terminal and starts to charge the calling terminal.

Step 521: After the O-MSC Server completes the Call Capacity Negotiation between the calling terminal and the called terminal, the calling terminal and the called terminal start to communicate with each other.

Step 522 is the same as step 325 shown in FIG. 3. When the calling terminal or the called terminal terminates the current call, the calling terminal sends a REL message to the T-MSC Server via the O-MSC Server, or the called terminal sends a REL message to the O-MSC Server via the T-MSC Server, to terminate the connection between the calling terminal and the called terminal and release the call, and then the O-MSC Server stops charging the calling terminal.

In step 505, if the current call is determined as a Speech Phone call, the O-MSC Server establishes a bearer connection from the MRBT platform to the calling terminal through the O-MSC Server, and the speech ring back tone subscribed by the called terminal for the calling terminal is played by the MRBT platform through the O-MGW. After the called terminal answers, the O-MSC Server terminates the bearer connection from the MRBT platform to the calling terminal through the O-MSC Server and establishes a communication link from the calling terminal to the called terminal to make the calling terminal and the called terminal communicate with each other. The procedure is the same as the procedure of implementing speech ring back tone in the prior art, which is independent of the VIG function of the O-MSC Server.

As shown in FIG. 5, since a communication link from the MRBT platform to the calling terminal which passes through the O-MSC Server and the O-MGW in turn could be established before the MRBT platform plays the multimedia ring back tone for the calling terminal, the Call Capacity Negotiation between the MRBT platform and the calling terminal should be completed. After the communication link between the MRBT platform and the calling terminal is established, the O-MSC Server will receive the ACM message sent by the T-MSC Server. Here, the O-MSC Server would not charge the calling terminal until the communication link between the calling terminal and the called terminal is established and the calling terminal and the called terminal are put through upon receiving the ANM message sent by the T-MSC Server. So there is no need to charge the calling terminal for the pre-established communication link between the MRBT platform and the calling terminal through the O-MSC Server for playing multimedia ring back tones, by which the calling terminal will not pay for receiving the multimedia ring back tone, thereby improving the users' enthusiasm of using multimedia ring back tone service and facilitate the popularization of multimedia ring back tone service.

To establish the communication link from the MRBT platform to the calling terminal which passes through the O-MSC Server and the O-MGW in turn, the O-MSC Server and the calling terminal should implement the Call Capacity Negotiation. Since the O-MSC Server does not know the call capacity level of the called terminal, it will select a media format according to the call capacity level supported by the calling terminal, and the MRBT platform will play the media ring back tone for the calling terminal through the established communication link. After the called terminal answers, the O-MSC Server will implement the Call Capacity Negotiation with the called terminal, and if the called terminal does not support the media format selected by the O-MSC Server selected for the calling terminal the current call fails.

In a similar way, to solve this problem, the call capacity level supported by each 3G communication network terminal should be investigated and taken statistics before the multimedia ring back tone service is carried out. Media formats supported by all terminals are selected and configured in the O-MSC Server, which will become the basis of Call Capacity Negotiation between the O-MSC Server and the calling terminal or the called terminal during the process of playing multimedia ring back tone and the communication between the calling terminal and the called terminal.

Once the called terminal does not support the selected media format supported by the calling terminal during the process of playing multimedia ring back tone, the O-MSC Server will transform the media format of the media streams transmitted by the called terminal during the communication process, which will guarantee the normal communication between the calling terminal and the called terminal.

In the embodiment shown in FIG. 5, the O-MSC Server and the MRBT platform may agree on several call capacity levels. Upon receiving the INVITE message sent by the O-MSC Server, the MRBT platform sends to the O-MSC Server the 200 OK message carrying the media format selected by it this time, informing the O-MSC Server of the media format used by the communication link established from the MRBT platform to the calling terminal, thereby reducing the signalling interaction processes of Call Capacity Negotiation for establishing communication link and shortening the response time of playing multimedia ring back tones.

Not only ISUP protocol but also other protocols may be adopted for interaction between the O-MSC Server and the T-MSC Server.

Since the ring back tone service of an embodiment of the present invention is subscribed by the called terminal and enjoyed by the calling terminal, the processing rules of playing speech ring back tones and playing multimedia ring back tones are relevant to the properties of the calling terminal and whether the communication network of the calling terminal support multimedia ring back tone, but not relevant to the properties of the called terminal and whether the communication network of the called terminal support multimedia ring back tone. The rules of different calling terminals being played for ring back tones of different styles in different communication networks are described as following:

If the calling terminal is a 2G terminal and the communication network of the calling terminal is a 2G communication network, the calling terminal may be played for speech ring back tones; if the calling terminal is a 2G terminal and the communication network of the calling terminal is a 3G communication network, the calling terminal may be played for speech ring back tones; if the calling terminal is a 3G terminal and the communication network of the calling terminal is a 2G communication network, the calling terminal may be played for speech ring back tones; if the calling terminal is a 3G terminal and the communication network of the calling terminal is a 3G communication network, no matter the communication network of the called terminal is a 3G or 2G communication network, the calling terminal may be played for multimedia ring back tones.

In a 3G communication network, when the calling terminal and the called terminal communicate with each other, if the calling terminal is a 3G terminal and the network of the calling terminal is a 3G communication network, but the called terminal is a 2G terminal, or a 3G terminal not supporting VP call, or a 3G terminal which belongs to a 2G communication network, the calling terminal and the called terminal may only implement speech communication, but cannot implement video communication.

Multimedia ring back tone service may be realized not only in WCDMA systems, but also in all kinds of 3G communication networks supporting multimedia information transfer.

The embodiment of the present invention may implement multimedia ring back tone service in 3G communication network. There is no voice channel alternation between the calling terminal and the called terminal when implementing multimedia ring back tone service by adopting the method of the present invention, and the problems of Call Capacity Negotiation of segmented terminals and charging during the call process may be solved effectively.

At the same time, if the called terminal is a 2G terminal, or a 3G terminal not supporting multimedia VP call, or a 3G terminal which belongs to a 2G communication network, the multimedia ring back tone service also may be provided for these terminals, and normal communication between the calling terminal and the called terminal may be ensued, i.e., a 2G terminal or a 3G terminal not supporting VP or a 3G terminal belonging to a 2G network also may apply the multimedia ring back tone service. When a 3G terminal supporting VP call as the calling terminal dials a 2G terminal or a 3G terminal not supporting VP call which has subscribed to the multimedia ring back tone service, multimedia ring back tones may be played for the calling terminal.

The present invention can also be applied to Next Generation Network (NGN) or the fourth generation (4G) communication network. When the present invention is applied to a NGN or 4G communication network, the VIG and the MRBT platform providing multimedia ring back tones will also be added in the communication network. Here, the VIG is used to support the MRBT platform to play the multimedia ring back tones for the terminal.

The above are just the relatively preferable embodiments of the present invention and are not intent to limit the protection scope defined by the accompanying claims of the present invention.

The invention claimed is:

1. A system for implementing Multimedia Ring Back Tone (MRBT) service, comprising:
a communication network;
a Video Interactive Gateway (VIG), for establishing a communication link from a calling terminal to an MRBT platform through a Multimedia Gateway (MGW) and the VIG during the interval of a call being initiated through a Service Switch Center by the calling terminal and the call being put through;
the MRBT platform, connected to the Service Switch Center dominating the calling terminal and the MGW in the communication network via the VIG respectively, for storing multimedia ring back tones and playing a multimedia ring back tone for the calling terminal via the established communication link.

2. The system of claim 1, wherein the communication network is one of a 3G communication network, a 4G communication network and a Next Generation Network (NGN); the Service Switch Center is Mobile Service Switch Center (MSC) Server.

3. The system of claim 1, wherein the VIG terminates the communication link between the VIG and the MRBT platform after the call is put through, and establishes a communication link from the Service Switch Center of called terminal to the called terminal to make the calling terminal and the called terminal communicate with each other.

4. A method for implementing Multimedia Ring Back Tone service, comprising:
configuring a multimedia ring back tone (MRBT) platform for storing multimedia ring back tones and a Video Interactive Gateway (VIG) for interacting with the MRBT platform and a calling terminal in the communication network;
establishing a communication link from the MRBT platform to the calling terminal via the VIG during the interval of the calling terminal initiating a call to a called terminal and the call being put through;
playing the multimedia ring back tone subscribed by the called terminal for the calling terminal via the communication link by the MRBT platform.

5. The method of claim 4, further comprising:
sending an Address Complete Message (ACM) to the Mobile switching center (MSC) Server by the VIG to which the calling terminal belongs when establishing the communication link;

upon receiving the ACM, putting through the calling terminal while not charging the calling terminal by the MSC Server.

6. The method of claim 5, further comprising:
terminating the communication link between the MRBT platform and the VIG when the call initiated by the calling terminal to the called terminal is put through;
establishing a communication link from VIG to the called terminal to make the calling terminal communicate with the called terminal through the VIG.

7. The method of claim 6, further comprising:
receiving an Answer Message (ANM) sent by the called terminal after the communication link from the VIG to the called terminal is established;
sending an ANM to the MSC Server to which the calling terminal belongs;
charging the calling terminal upon receiving the ANM.

8. The method of claim 4, further comprising:
determining whether the called terminal has subscribed a multimedia ring back tone on the MRBT platform and paging the called terminal before establishing the communication link.

9. The method of claim 4, wherein before the process of playing a multimedia ring back tone on the MRBT platform further comprises:
inquiring subscription information of the called terminal from the Home Location Register (HLR) by the MSC Server to which the calling terminal belongs;
returning a message indicating whether the called terminal has subscribed a multimedia ring back tone on the MRBT platform from the HLR to the MSC Server.

10. The method of claim 9, wherein the message indicating whether the called terminal has subscribed a multimedia ring back tone on the MRBT platform is a Send Routing Information acknowledge (SRI-ACK) Message carrying the information indicating whether the called terminal has subscribed a multimedia ring back tone.

11. The method of claim 9, further comprising:
deciding whether the call initiated by the calling terminal is a video phone call and the communication network supports the video phone call, and if yes, implement the process of inquiring subscription information of the called terminal; otherwise, establishing a bearer link from the calling terminal to the MRBT platform, and sending the ring back tone subscribed by the called terminal and stored on the MRBT platform to the calling terminal through the bearer link.

12. The method of claim 11, further comprising:
terminating the bearer link from the MRBT platform to the calling terminal after the call initiated by the calling terminal to the called terminal is put through and the ring back tone subscribed by the called terminal and stored by the MRBT platform is sent to the calling terminal through the bearing link;
establishing a communication link from the calling terminal to the called terminal to make the calling terminal and the called terminal communicate with each other.

13. The method of claim 4, further comprising: configuring media format for the calling terminal in the VIG;
wherein the ring back tone subscribed by the called terminal and stored by the MRBT platform and is sent to the calling terminal according to said media format.

14. The method of claim 13, wherein the media format for the calling terminal is configured according to the result of Call Capacity Negotiation between the VIG and the calling terminal or call capacity level of the calling terminal which is stored in the MRBT platform in advance and sent from the MRBT platform to the VIG.

15. A system for implementing Multimedia Ring Back Tone (MRBT) service, comprising:
a Wideband Code Division Multiple Access (WCDMA) network;
a Video Interactive Gateway (VIG), for establishing a communication link from a calling terminal to an MRBT platform through a Multimedia Gateway (MGW) and the VIG during the interval of a call being initiated through a Service Switch Center by the calling terminal and the call being put through;
the MRBT platform, connected to the Service Switch Center dominating the calling terminal and the MGW in the WCDMA network via the VIG respectively, for storing multimedia ring back tones and playing a multimedia ring back tone for the calling terminal via the established communication link.

16. A Multimedia Ring Back Tone (MRBT) platform, connected to a Service Switch Center dominating a calling terminal and a Multimedia Gateway (MGW) in a communication network via a Video Interactive Gateway (VIG) respectively, comprising:
a unit for storing multimedia ring back tones; and
a unit for playing a multimedia ring back tone for the calling terminal via an established communication link between the MRBT platform and the calling terminal via the VIG and the MGW.

17. A method for implementing Multimedia Ring Back Tone (MRBT) service, comprising: establishing a communication link from an MRBT platform to a calling terminal via a Video Interactive Gateway (VIG) during the interval of the calling terminal initiating a call to a called terminal and the call being put through; playing a stored multimedia ring back tone subscribed by the called terminal for the calling terminal via a communication link by the MRBT platform.

* * * * *